Sept. 2, 1969          P. L. CIACCIO          3,464,076
SEWER RODDING MACHINE WITH POWER REEL
Filed March 4, 1968          3 Sheets-Sheet 3
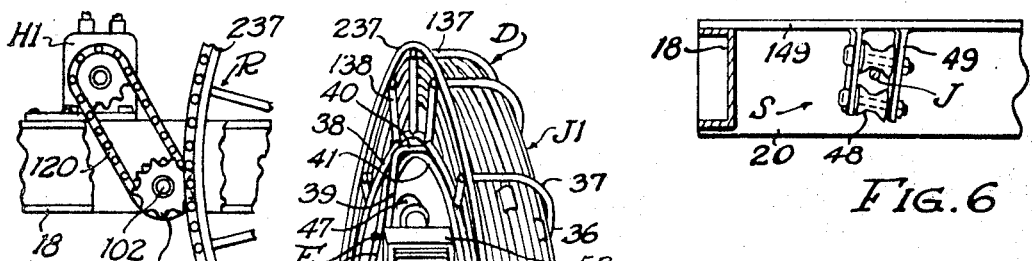
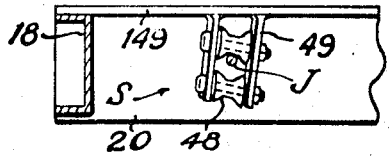
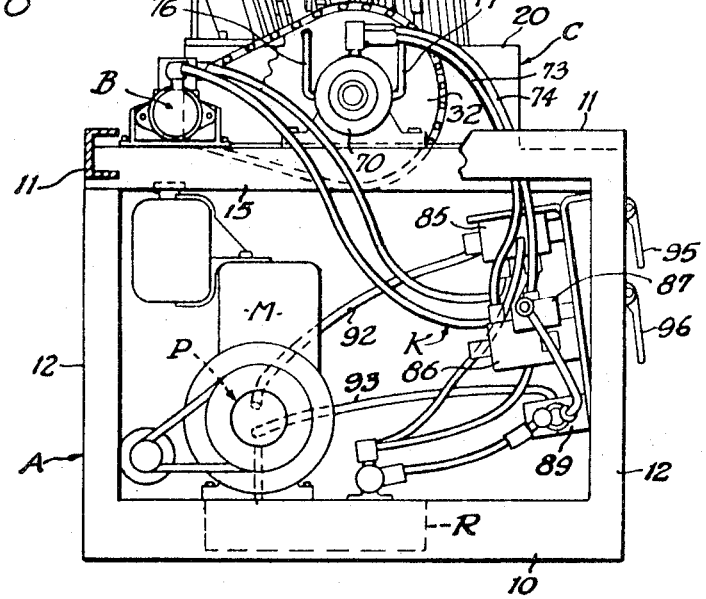
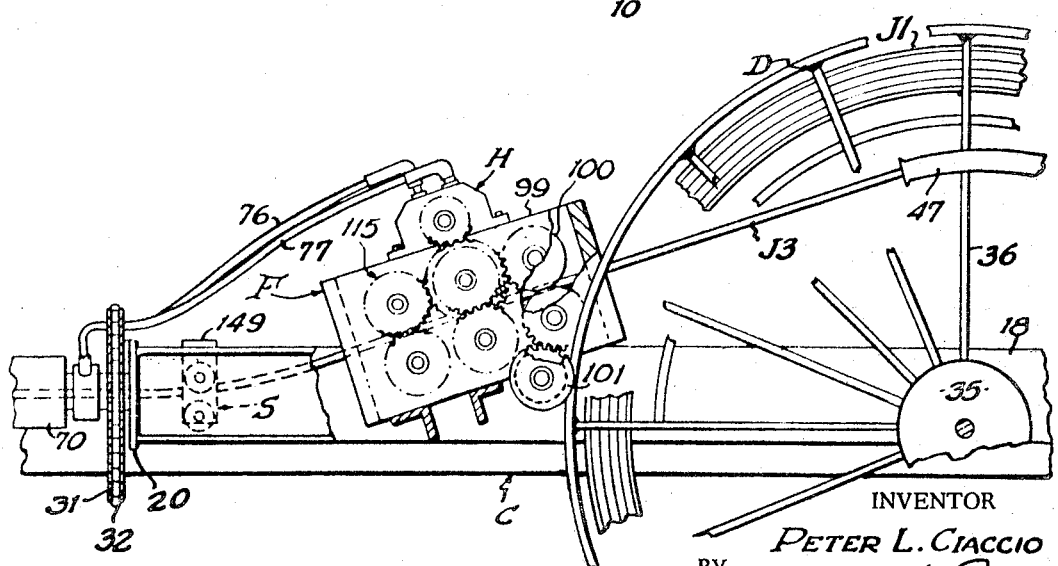
INVENTOR
PETER L. CIACCIO
BY
*Lynn H. Latta*
~ATTORNEY~

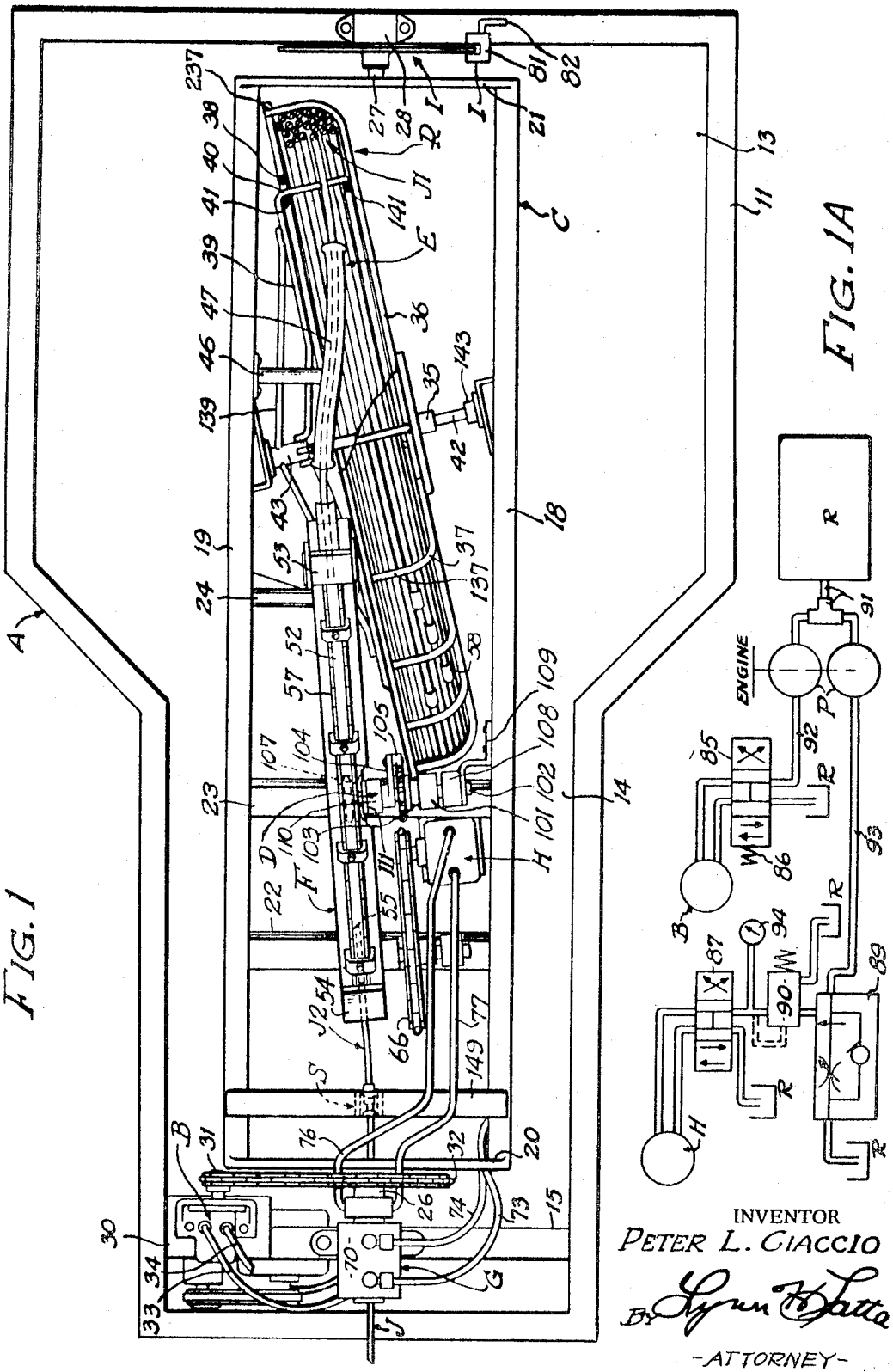

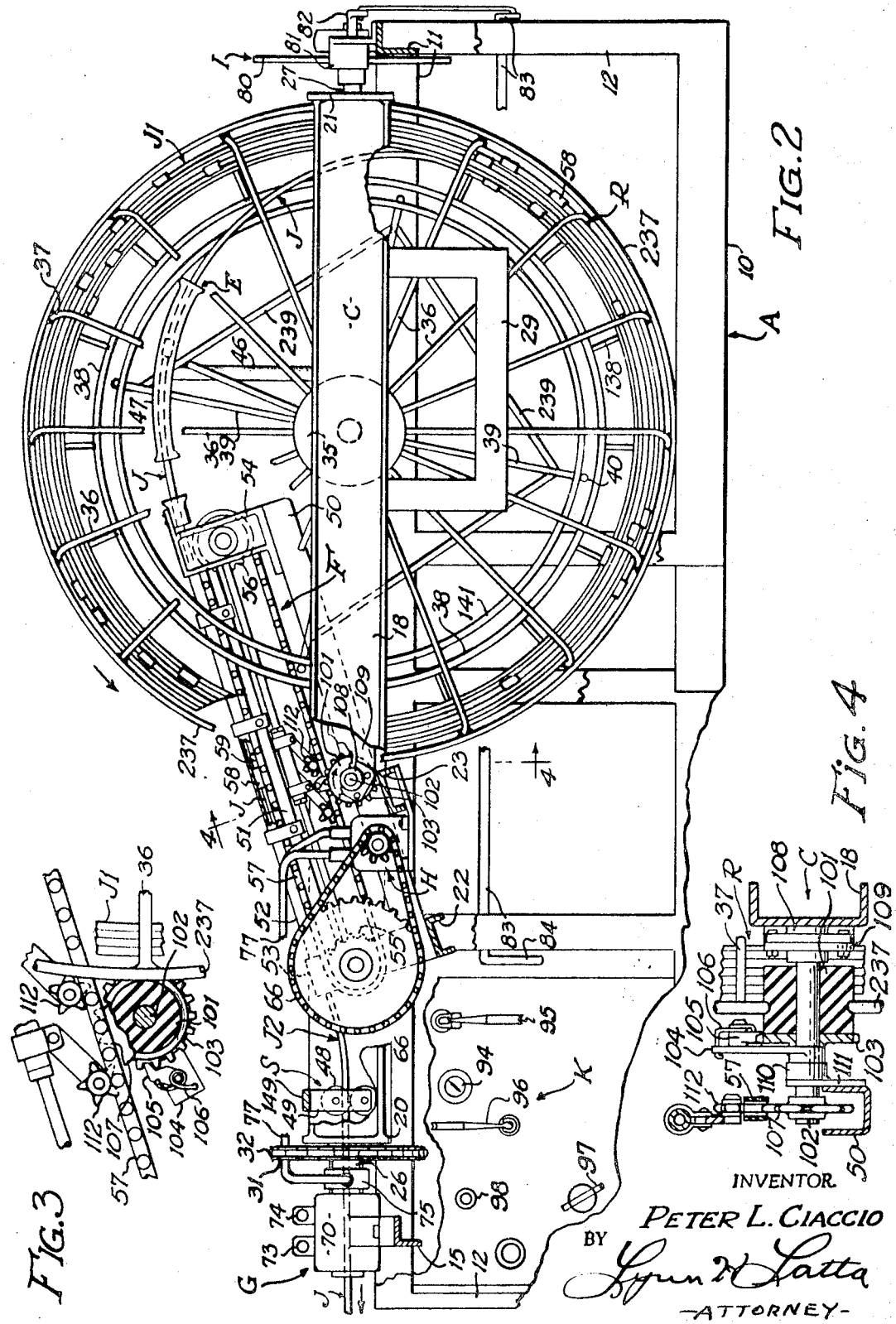

United States Patent Office 3,464,076
Patented Sept. 2, 1969

3,464,076
SEWER RODDING MACHINE WITH POWER REEL
Peter L. Ciaccio, Los Angeles, Calif., assignor to Flexible, Inc., Pittsburgh, Pa., a corporation of Delaware
Continuation-in-part of application Ser. No. 636,838, May 8, 1967. This application Mar. 4, 1968, Ser. No. 710,352
Int. Cl. B08b 9/04; B65k 75/00
U.S. Cl. 15—104.3     10 Claims

ABSTRACT OF THE DISCLOSURE

A sewer rod feeding machine having a rod-storage reel mounted in a rotating carriage and turning therewith so that sewer rod fed tangentially from the reel may be rotated for driving a cleaning tool in a sewer. The reel is mounted for rod-feeding rotation on an axis that is generally transverse to the carriage axis, but diagonally disposed so that the reel extends diagonally within the carriage and the rod passes diagonally through an opening in one side of the reel in a plane generally parallel to the carriage axis so that the rod may be fed in as nearly a straight line as possible from the reel to a tubular guide at the forward end of the carriage through which it is issued from the machine on the carriage axis. Between the reel and the tubular guide is a rod feed unit driven by a hydraulic motor mounted on the carriage. The feed unit and motor both turn with the carriage. A one-way slipping drive to the reel is provided by a pulley driven in timed relation to the rod-feed unit and frictionally engaging the rim of the reel so as to force-feed the rod out of the reel to the rod-feed unit. This slipping drive is overruled by the rod feed unit during reverse operation, the rod-feed unit feeding the rod back into the reel without interference by the reel-drive unit.

RELATED APPLICATION

This application is a continuation-in-part of my pending patent application, Ser. No. 636,838, filed May 8, 1967, now Patent No. 3,393,415, for Sewer Rodding machine with Wobble Reel.

BACKGROUND OF INVENTION

A sewer rod feeding machine having a frame which turns bodily about a longitudinal axis on which rod is fed out of and back into the machine, the turning frame imparting rotation to the rod for driving a rotary cleaning tool within a sewer; and having a reel mounted in the frame in a plane nearly parallel to such longitudinal axis but disposed diagonally so that the rod can be fed tangentially from the interior of a roll of rod contained in the reel through a rod-feed unit which is disposed between the reel and the front end of the frame, along a path of tangency to the rod coil in the reel and to the said longitudinal feed axis, is disclosed in my aforesaid patent.

OBJECTS OF INVENTION

The general object of the present invention is to improve upon the machine disclosed in my aforesaid patent, by providing for slipping drive of the reel at a rate at least equal to the rate at which the rod is withdrawn from the reel by the rod-feed unit, whereby the reel will feed the rod to the feed unit as fast as the latter will accept it, thus preventing the feed unit from pulling the rod out of the reel, which could result in the coils of rod within the reel being loosened and drawn inwardly toward the reel axis and ultimately becoming tangled and kinked.

Another object is to provide for a reverse type of operation in the retraction of the rod into the reel, in which the rod-feed unit overrules the reel-drive unit and force-feeds the rod into the reel so as to snug the coils of rod into a tight coil within the reel, the reel-drive unit being overrun by its drive connection and thus becoming inoperative to drive the reel, which is then driven by the rod being pushed into it by the feed unit.

Among other objects the invention aims to provide a sewer rodding machine having the following combination of advantageous features:

(1) of maximum simplicity and sturdiness of construction and freedom from breakdown and operational difficulties;

(2) longitudinally compact;

(3) having the wider operational flexibility of independent dual hydraulic drives in the control and co-ordination of rod rotation and rod feed at varying rotational and linear speeds and varying torque and linear push and pull applied to the rod, depending upon varying conditions encountered in a sewer;

(4) having a diagonally positioned pancake type reel, feeding inwardly and diagonally through an open side thereof;

(5) having an elongated rod feed unit and reel disposed in overlapping relation such as to improve longitudinal compactness;

Further objects are:

(a) to provide an improved arrangement for feeding sewer rod from a reel discharge point which is offset both above and laterally from the axis of rotation of a carriage in which the reel is mounted for rotation in a plane diagonal with reference to the axis, wherein the rod is straightened as it becomes tangent to and leaves the machine along this axis of carriage rotation.

(b) to provide a rodding machine which, in addition to features (1)–(5) above, embodies a rod feed unit disposed diagonally with reference to the rotational axis of a rotating carriage in which both reel and feed unit are mounted, whereby the rod may feed tangentially from the reel into the feed unit and thence to the carriage axis so as to exit from the machine along the carriage axis with a minimum of bending.

In the drawings:

FIG. 1 is a plan view, partially in section, of a sewer rodding machine embodying the invention, utilizing a chain type rod unit;

FIG. 1A is a schematic diagram of the hydraulic circuit of the machine;

FIG. 2 is a side elevational view of the machine, with portions broken away;

FIG. 3 is a detail sectional view of the reel-drive unit;

FIG. 4 is a cross-sectional view taken on line 4—4 of FIG. 2;

FIG. 5 is a front end elevational view, partially in section, of the machine of FIGS. 1 and 2;

FIG. 6 is a detail of the rod-straightening guide;

FIG. 7 is a fragmentary elevational view of a modified form of the invention; and FIG. 8 is a fragmentary elevational view of another modification;

DESCRIPTION

Referring now to the drawings in detail, and particularly to FIGS. 1 and 2, I have shown therein, as an example of one form in which the invention may be embodied, a sewer rodding machine comprising, in general, a support frame A which may be mounted on wheels (not shown) for transport between jobs; a hydraulic motor B driving a carriage C mounted at its respective ends for rotation about its longitudinal axis; a reel R for storing tool drive rod in its periphery; a traverse guide E for deflecting the rod diagonally from the inner periphery of a coil J1 of rod within the reel through an open side of the reel; an elongated chain feed unit F for feeding the rod from the reel into a sewer and vice versa; a hydraulic motor H for driving the feed unit F; a combined fluid coupling and projection guide unit G mounting the forward end of carriage C on support frame A; a combined trunnion and brake unit I connecting the rear end of carriage C to frame A; a rod-straightening unit S for straightening the rod while guiding it into the guide E, and the improved reel-drive unit D of the present invention. Reel R rotates on an axis that is generally transverse with reference to the rotational axis defined by gland G and trunnion unit I. Carriage C is rotated on this carriage axis by drive from motor B, and reel R turns bodily with carriage C while rotating on its own axis in response to the action of reel drive unit D in rotating the reel so as to discharge drive rod J from the reel or the action of feed unit F in withdrawing the rod from the sewer and pushing it back into the reel. The bodily turning of the reel with the carriage effects rotation of the rod and a cleaning tool driven by its forward end within a sewer. A group of controls K on a control panel can be operated so as to independently control the hydraulic motors B and H for selectively advancing or retracting the drive rod J while rotating it forwardly, or in reverse, or without rotation of the rod, depending on the requirements of conditions encountered in a sewer. Alternatively, the controls can be operated so as to effect rotation of the rod J in either direction without either advancing or retracting the rod. Control over speeds of rotation and of linear feed is also provided. The amounts of torque and of linear force applied to the rod J can also be controlled, all as explained more in detail hereinafter. A pump P, driven by an engine M (e.g. gasolene engine) provides hydraulic fluid under pressure to motors B and H as called for by operation of controls K.

In detail, frame A is of box form including a base frame 10 and a top frame 11 integrally joined by vertical legs 12, the top frame 11 (and optionally the base frame 10) being of key-hole planform so as to provide in the rear half of the frame a relatively wide space 13 with sufficient clearance for the reel D to turn therein without interference; and in the forward half of the frame a relatively narrow space 14, just wide enough to accommodate the carriage C and the other mechanism mounted therein. In addition to end cross bars, top frame 11 includes near its front end a cross bar 15 on which gland unit G and motor B are mounted.

Carriage C is relatively long and narrow, including parallel side beams 18 and 19, end cross bars 20 and 21, and intermediate cross bars 22 and 23 and bracket 24, on which feed unit F is mounted. To the center of front cross bar 20 is secured a tubular trunnion 26 (part of gland G) which is journalled in a bearing portion of gland G. To the rear cross bar 21 is secured a trunnion 27 which is journalled in a bearing 28 on the rear cross bar of the top frame 11 of support frame A. Carriage C includes a pair of counterweights 29 on the opposite side of its axis from feed unit F, for substantially counterbalancing the feed unit and the traverse guide unit E during carriage rotation.

Motor B is a high torque positive displacement hydraulic motor such as the Char-Lyn. It has a mount bracket which is mounted on a plate 30 secured to cross bar 15 of the support frame A. Secured to the shaft of motor B is a sprocket which drives a chain 31 trained around a sprocket 32 secured on the tubular trunnion 26, through which rotation is transmitted to carriage C. For adjustment purposes, the motor bracket is shiftable to a limited extent with respect to its mounting bolts and is secured in a selected position of adjustment on plate 30 by tightening the bolts. Hydraulic hoses 33 and 34 provide fluid line connections from control group K to motor B.

Reel R is preferably of cage form, of welded rod construction, including a closed side consisting of a spider embodying a hub 35 and spokes 36 radiating therefrom in a common plane; a peripheral rod-storage portion consisting of peripheral bends 37 extending from the outer ends of respective spokes 36 and terminating in straight peripheral bars 137 parallel to the reel axis, a peripheral drive ring 237 secured to the outer sides of the ends of bars 137, a ring 38 at the same side of the reel, and short radial spokes 138 connecting the ring 38 to the inner sides of the ends of bars 137. Ring 38 defines a large circular opening, concentric with the reel axis, within which is a stationary reel mouth for traverse of the rod J out of and into the reel. The radial depth of the reel R from ring 38 to the periphery of the reel is such as to define a toroidal reel chamber within loops 37, of radial depth sufficient to satisfactorily contain a coil J1 of rod of the maximum length that may be called for in the use of the machine. The reel chamber is defined interiorly by a fixed guard frame comprising a plurality of support spokes 39 (four are shown) secured to and fixedly supported by a bearing 43 in which one end of the reel axle is journalled. The spokes 39 radiate outwardly to a radius just inside the ring 38, where they are bent at right angles to provide a plurality of axially-extending guard bars 40 at the inner radius of the reel chamber. Spacer rings 41 and 141 are secured to the respective ends of bars 40 to hold them in equal spacing circumferentially, and to brace the guard structure. Bracing spokes 139 are secured to bearing 43 in axially-spaced relation to spokes 39, and are secured to the latter near their outer ends to brace the guard frame against axial shifting. Braces 239 are secured to spokes 39 and extend diagonally therebetween on three sides of the guard frame, the fourth being open adjacent the upper end of feed unit F to avoid interference therewith. In the open side of the reel, the spacer ring 41 of the guard frame defines the reel mouth through which the rod J passes in leaving and entering the reel. Real R is mounted by means of its hub 35 on a shaft 42 the ends of which are journalled in bearing 43 and 143 on brackets secured to the respective side beams 18, 19 of carriage C, in staggered positions such as to dispose the reel axis in a diagonally transverse position, and to correspondingly locate the plane of the reel D in a diagonal position extending predominantly in longitudinal relation to the carriage from side to side. The reel mouth faces forwardly to a minor extent, sufficient for the rod J to exit from the reel in a substantially vertical plane which is nearly parallel to the carriage, but diverges from such parallelism at the open side of the reel, sufficiently to establish substantial tangency with the rod coil J1 near the rear extremity thereof, located near one side of the carriage. This is best seen in FIG. 1.

Traverse guide E comprises a bracket post 46 secured to carriage side frame beam 19 and inclined upwardly to a point within the reel mouth and spaced somewhat below ring 41, where it supports a guide tube 47 secured to its upper end in crossed relation thereto, defining a T. Tube 47 is arcuate, extending in a generally vertical plane generally parallel to the carriage axis, and is arched upwardly, with its forward end outside the reel and substantially tangent to the longitudinal feed axis of feed unit F, and its rear end inside the reel. Thus it functions to guide the rod J in traversing from inside to outside the reel through the reel mouth without dragging against mouth ring 41 or any other portion of the reel.

Rod-straightening guide S (FIG. 6) comprises a pair of annularly-grooved rollers 48 mounted in a clevis 49 in spaced opposed relation with their common bisector plane tilted with reference to the plane of carriage C and diagonal with reference to the axis of rotation of carriage C. This is accomplished by positioning the clevis 49 on a vertically-tilted major axis, with its bisector plane slightly skewed around this axis from parallelism with the carriage rotational axis, approximately as shown in FIG. 6, so that the axis of the upper roller 48 is normal to the common plane of the curved traversing portion of rod J including the portions emerging from feed unit F and entering guide-coupling G, as indicated at J2. The upper roller 48 thus exerts pressure against this traversing portion of the rod, such as to bow it, at J2, in said common plane, into reverse curvature with reference to the curvature of the rod in reel D, such that as the rod emerges from guide-coupling G, free of bending stresses, it will have been bent by the reverse bowing into a straight rod which will transmit torque to a rotary sewer tool with maximum efficiency. Clevis 49 is mounted to carriage C by a cross bar 149.

Feed unit F is of a type, generally like that shown in Ciaccio Patent No. 3,120,017, comprising an elongated frame embodying a base beam 50 parallel to a pair of spaced guide bars 51 and 52, the latter being an inverted channel at the top of the frame, secured to and extending between end posts 53 and 54, in which are journalled respective sprockets 55, 56. A chain 57 has an upper stretch confined between guide bars 51, 52 while engaging and driving a stretch of the rod J confined between said upper chain stretch and the guide bar 51. In the area of confinement between the upper chain stretch and guide bar 51, couplings 58 on rod J are engaged by notched (bifurcated) drive lugs 59 which straddle the rod sections that are joined by the couplings 58. Thus the rod is fed linearly in projecting or retracting direction, depending on the direction of rotation of sprockets 55, 56. The feed unit F overlaps the forward half of reel D on the open side thereof, and its rear end projects into the reel mouth defined within.

Base beam 50 is mounted upon the carriage acrossbars 22 and 23 and bracket 24, which parts are disposed at graduated elevations so as to position feed unit F along an inclined longitudinal axis of feed of rod J from traverse guide E to an exit guide embodied in gland G. The inclination of this axis is such as to establish tangency of the forward end of this feed axis at the rear end of gland G, through a short bowed stretch of the rod at J2, and to establish tangency of the rear end of this inclined feed axis with the stretch of rod J issuing from or entering the forward end of traverse guide E, which is at a substantial height above the center of the reel.

Hydraulic motor H may be of the same type as motor B, with high-torque drive characteristics. It has a mount bracket adjustably mounted on carriage cross beam 23. The motor H, through a sprocket and chain drive 66, drives the shaft of feed unit sprocket 55, for operating the feed unit F in rod-projecting or rod-retracting direction, depending on the direction of drive.

Reel drive unit D comprises a drive pulley 101 of soft rubber (of approximately 50 shore hardness) or equivalent frictional, wear-resistant material, rotatably mounted on a drive shaft 102 and frictionally engaged against the peripheral drive ring 237 of the reel, a ratchet wheel 103, (FIG. 6) secured to an end of pulley 101, a drive arm 104, a pawl 105 pivoted to the outer end of arm 104 and urged by a torsion spring 106 into driving engagement with teeth on the periphery of ratchet wheel 103, and a sprocket 107 on shaft 102, meshing from below with the lower side of feed chain 57 and receiving drive therefrom to drive the shaft 102. The outer end of shaft 102 is journalled in a bearing 108 (FIG. 1) carried by a bracket plate 109 secured to the inner side of carriage side beam 18, and the inner end of the shaft is journalled in a bearing 110 mounted on a bracket plate 111 secured to the lower frame member 50 of feed unit F. Bearings 108 and 110 are adjustably secured to their respective brackets 109, 111. A pair of idler sprockets 112 hold down the stretch of chain 57 engaging sprocket 107 so as to maintain driving engagement therewith.

The parts are arranged so that drive will be transmitted to reel R from pulley 101 when rod J is being projected from the machine as indicated by the arrow in FIG. 2, the reel turning counterclockwise as viewed in that figure, also as indicated by arrow. The lower stretch of feed chain 57 will be travelling toward reel R, and hence will rotate the sprocket 107 and shaft 102 clockwise as seen in FIG. 2 and as indicated by arrow. In this direction of rotation, shaft 102 will transmit such rotation to pulley 101 through arm 104 and pawl 105. Pulley 101 in turn will transmit rotation to reel R through frictional engagement with drive ring 237. The drive ratio from feed chain 57 to pulley 101 is such that the speed of rotation transmitted to reel R by pulley 101 is never less than the speed at which the rod J would drive the reel in response to the action of feed unit F in pulling the rod from the reel, if the reel drive unit D were not present. The drive to the reel may be synchronized to the withdrawal of rod from the reel at the fastest rate of reel rotation that could be effected by feed unit F, at the beginning of a job when all of the rod J is withdrawn within the machine and the coil J1 in the reel is of maximum bulk and its inner diameter correspondingly at a minimum so as to have maximum rotational speed in relation to the linear speed of tangential withdrawal into feed unit F. As the inner diameter of coil J1 enlarges with increasing withdrawal of rod J, the rotation of reel R will slow down in relation to the tangential speed of withdrawal. The drive from pulley 101 to reel R will then become an increasingly slipping one, the reel pushing the rod J into the feed unit F as fast as the latter will accept it, but no faster. Thus the increasing differential between the circumferential speed of reel rotation and linear speed of travel of rod J to feed unit F, will be adjusted by slippage between pulley 101 and drive ring 237, and the reel will always be driven by drive unit D at a rate fast enough to match the speed of withdrawal of rod J by feed unit F. Hence, during projection of rod J the coils of rod within the reel will be constrained to remain in a tight coil J1 within the reel and the inner coils can not be pulled loose from the interior of coil J1.

Preferably, the drive ratios are such that the drive from pulley 101 is a slightly slipping one even at the beginning of rod projection when the coil J1 is full, i.e., the drive is always a slipping one. However, a positive, non-slipping drive gearing can be used, as explained more fully hereinafter.

If the operator should suddenly stop or drastically slow down the operation of feed unit F, the tendency of the reel to continue its rotation by momentum, will be restrained by feed unit F, transmitting a holding action back through rod J to coil J1.

When the machine is being operated to retract the rod from the sewer, the shaft 102 is driven at a rotational speed greater than that of pulley 101 as transmitted from drive ring 237. Since the frictional engagement between drive ring 237 and pulley 101 would objectionably wear the pulley under slippage between them, the shaft 102 and pawl 106 are made operable to overrun the pulley 101 during the retracting operation, permitting the pulley 101 to track freely on the ring 237 without slippage, and reel R will be driven by the rod J as the latter is pushed into the reel by feed unit F. Hence the rod will be snugged into the coil J1 so that the latter will be tightly packed.

Gland G may be of the type disclosed in Patent No. 3,176,335 including the tubular trunnion element 26 and a cylindrical jacket 70 having a suitable bearing liner (not shown) in which element 26 is rotatably mounted, and having suitable internal rotatable hydraulic connections (not shown) between a pair of hydraulic passages in trunnion element 26 and a pair of external fittings on jacket 70, to which are coupled respective hydraulic hoses 73 and 74, extending to control group K. Tubular trunnion 26 includes an integral collar portion 75 providing for suitable hydraulic hoses 76, and 77. Hoses 76, 77 extend through apertures in carriage-drive sprocket 32 and above cross bar 20 of carriage C, thence to feed motor H.

Trunnion-brake unit I includes a brake disc 80 secured on trunnion 27, a clamping jaw unit 81 operated by a lever 82 and an operating linkage 83 connecting the lever 82 to an operating handle 84 adjacent control group K.

Control group K includes a reversible valve 85 for controlling motor B to effect rotation of carriage C selectively in either direction and to stop rotation. Valve 85 may optionally include flow volume control means 86 for varying the speed of rotation of the cleaning tool in a sewer. A valve 87 is provided for controlling the linear feed motion of rod J selectively in advancing and retracting directions, and to stop the feed. A dump valve 89 is provided for controlling the speed of the rod feed motion. A pressure regulating valve 90 is provided for controlling the hydraulic pressure in the hydraulic lines so as to control the torque applied in the rotation of the rod J, and the push or pull applied to the rod in advancing or retracting it as the case may be. Valve 90 may be a pressure relief type of valve, bypassing fluid back to a reservoir T at a pressure exceeding a selected pressure which may be regulated by operation of the valve, and thus applying the selected pressure to the fluid in the circuit so as to control the amount of push that is applied to the rod as it is fed into the sewer or pulled back.

Pump P may be a dual pump, i.e., two pumps receiving fluid from reservoir T in parallel, as at 91 and delivering their separate outputs to carriage-drive motor B through valve 85 and a feed line 92, and through a separate line 93 and the valves 89, 90 and 87 therein, to the rod-feed motor H. A pressure meter 94 may be connected to line 93, to indicate rod-feed pressure. In general, this hydraulic circuit is similar to that disclosed in the aforesaid Patent No. 3,176,335.

The operation of the machine will be largely apparent from the foregoing description. Separate manual control handles 95, 96 and 98 are provided for operating valves 85, 87, 89 and 90 respectively. Thus carriage turning (and hence rod rotation) can be controlled by operation of valve 85, with control over direction of rotation, starting, stopping and (where flow volume control is included in the valve) speed of rotation. Independently of such control of rotation, the feed of the rod can be controlled as to direction, speed and applied push or pull, by operation of valves 87, 90 and 89 respectively.

As shown in FIG. 7, where continuous rod J3, without joints, is utilized by the machine, the feed unit F2 may be a roll feed unit such as that disclosed in the aforesaid Patent No. 2,176,335, a hydraulic motor H being mounted directly on the frame 99 of unit F2 and directly driving the shaft of one of the rolls being driven by a chain of gears 115.

Feed unit F2 is interchangeable with the feed unit of FIGS. 1–5. In order to standardize on the remainder of the machine, it is made the same (as to dimensions and arrangement of parts) but the roll-feed unit may be shorter as shown. Also there may be some over-lapping of the reel and feed unit, in the arrangement of FIG. 7, though not necessarily as much as with the chain feed unit. Feed unit F2 may be mounted in carriage C in an inclined position so as to feed the rod downwardly from the upper area of reel R to the carriage axis. Alternatively, feed unit F2 may be mounted in the extreme front end of carriage B, immediately adjacent front cross bar 20, with the tubular core of coupling guide G extending through and secured in the front end frame member of unit F2, and with rod-straightening unit S and its supporting cross bar moved rearwardly to a position just rearward of unit F2 and functioning to straighten the rod before it enters the unit F2 from reel R. Reel drive pulley 101 may be driven from gear train 115 as shown.

Instead of taking off the reel drive from feed unit F according to FIG. 3, the reel drive pulley 101 may be driven by its own motor (e.g. the motore H1 of FIG. 8) independently of the drive from motor H to the feed unit F. A drive chain 120 may be used to transmit drive from motor H1 to reel drive shaft 102.

For long-life operation without the need for replacement of the drive pulley 101 due to wear, the invention in some installations may utilize a positive drive from a sprocket 121 on reel drive shaft 102, to a sprocket chain 122 completely encircling and welded to reel drive ring 237. In such a construction, the motor H1 may be equipped with a suitable hydraulic by-pass valve of a pressure-relief type such as to allow the motor to decrease speed in response to a build-up of hydraulic fluid pressure above the upper limit of a normal operating range for adequate driving power to turn the reel sufficiently to feed the drive rod J to the feed unit F at the rate at which the latter will accept it. Thus, when the internal diameter of the coil J1 is enlarged by feeding part of the rod out of the machine, so as to tend to increase the tangential rate of issuance of the rod from the coil, the resistance of the rod to being pushed into the feed unit F faster than the linear rate of feed by unit F, will create a back pressure against motor H1 sufficient to open the bypass valve and allow the motor to slow down. Since such bypass means are well known, no illustration thereof is given, and the showing of motor H1 may be taken as including a suitable pressure relief bypass means such as to give it, in effect, a slipping action equivalent to that of slipping drive pulley 101.

We claim:
1. In a sewer rodding machine including:
    a support frame;
    an elongated carriage having means at forward and rear ends thereof mounting it in said support frame for rotation about its longitudinal axis;
    said carriage including a tubular rod guide extending through the forward carriage-mounting means, for projection and retraction of sewer tool drive rod;
    a reel rotatable in said carriage, for storage and dispensing of said drive rod;
    drive means operating between said support frame and said carriage for turning said carriage about its said axis, thereby transmitting tool-driving rotation to said rod;
    a rod-feed unit mounted in said carriage between said reel and said guide and engageable with said rod to effect said feeding thereof while turning with said carriage;
    and a drive motor mounted on said carriage, turning therewith, and transmitting drive to said rod-feed means;
    the improvement which comprises:
        said reel being pancake form, including a peripheral portion for internal storage of rod and one side portion including a supporting hub, and having in its opposite side a substantially circular mouth for traverse of the rod out of and into the reel diagonally of the plane of the reel; and
        power-driven reel-drive means providing a slipping drive to said reel for turning it in rod-projecting direction at a speed sufficient to feed the rod out of the reel to said rod-feed unit at a linear speed always equal to the rod-feed speed of said unit.

2. A rodding machine as defined in claim 1, wherein said reel includes a peripheral drive ring and said reel-drive means includes a drive pulley in frictional engagement with said drive ring.

3. A rodding machine as defined in claim 1, wherein said reel-drive means includes one-way drive means operable to overrun its drive connection to the reel during rod-retracting rotation of the reel, whereby the reel will be rotated in response to the feeding of rod into it by said rod-feed unit, without interference from said reel-drive means.

4. A rodding machine as defined in claim 1, wherein said reel includes a peripheral drive ring and said reel-drive means includes a drive pulley in frictional engagement with said drive ring;
    and a one-way drive connection from a power source to said drive pulley, operable to drive the same for turning the reel in rod-feed direction and to overrun during rod-retracting rotation of the reel, whereby the reel will be rotated in response to the feeding of rod into it by said rod-feed unit, without interference from said reel-drive means.

5. A rodding machine as defined in claim 1, wherein said reel includes a peripheral drive ring and said reel-drive means includes a drive pulley in frictional engagement with said drive ring;

and a one-way drive connection from a power source to said drive pulley, operable to drive the same for turning the reel in rod-feed direction and to overrun during rod-retracting rotation of the reel, whereby the reel will be rotated in response to the feeding of rod into it by said rod-feed unit, without interference from said reel-drive means;

said one-way drive comprising a drive shaft, a ratchet wheel secured to said pulley, an arm secured to said drive shaft and extending radially alongside said ratchet wheel, and a pawl carried by said arm and having one-way engagement with said ratchet wheel.

6. A rodding machine as defined in claim 1, wherein said reel-drive means includes a drive shaft receiving drive from said rod-feed unit;

a drive pulley loosely mounted on said shaft and having frictional driving engagement with said reel;

and a one-way drive connection between said shaft and said pulley, operable to transmit drive to said pulley for rod-projecting drive of said reel, and to overrun the pulley in the reverse direction during rod-retracting rotation of the reel, whereby the reel will be rotated in response to the feeding of rod into it by said rod-feed unit, without interference from said reel drive means.

7. A rodding machine as defined in claim 1, wherein said rod-feed unit includes a feed chain moving linearly parallel to the path of rod-feed from the reel, and having means to engage the rod for feeding it, and wherein;

said reel-drive means comprises a drive shaft having a driven pulley receiving drive from a lower stretch of said feed-chain;

a drive pulley loosely mounted on said shaft and having frictional driving engagement with said reel;

and a one-way drive connection between said shaft and said pulley, operable to transmit drive to said pulley for rod-projecting drive of said reel, and to overrun the pulley in the reverse direction during rod-retracting rotation of the reel, whereby the reel will be rotated in response to the feeding of rod into it by said rod-feed unit, without interference from said reel-drive means.

8. A rodding machine as defined in claim 1, including: means rotatably supporting said reel in said carriage by means of said hub for rotation on an axis extending diagonally across said carriage whereby said reel is disposed with its said plane extending diagonally with reference to said carriage axis and with its said mouth facing diagonally forwardly, whereby said rod traverses said mouth diagonally in a plane substantially parallel to said carriage axis.

9. A rodding machine as defined in claim 1, including: means rotatably supporting said reel in said carriage by means of said hub for rotation on an axis extending diagonally across said carriage whereby said reel is disposed with its said plane extending diagonally with reference to said carriage axis and with its said mouth facing diagonally forwardly, whereby said rod traverses said mouth diagonally in a plane substantially parallel to said carriage axis; said rod-feeding unit being disposed generally between said reel and said guide in an inclined position with its forward end adjacent the carriage axis and its rear end disposed between the carriage axis and the periphery of the reel, the reel axis traversing the carriage near the carriage axis.

10. A rodding machine as defined in claim 1, including: means rotatably supporting said reel in said carriage by means of said hub for rotation on an axis extending diagonally across said carriage whereby said reel is disposed with its said plane extending diagonally with reference to said carriage axis and with its said mouth facing diagonally forwardly, whereby said rod traverses said mouth diagonally in a plane substantially parallel to said carriage axis;

wherein said reel has one side of its forward portion disposed adjacent one side of the carriage and its other side substantially spaced from the other side of the carriage, and wherein said rod feed unit has its rear end portion in overlapping relation to the forward portion of said reel between said other side of the reel and said other side of the carriage.

References Cited

UNITED STATES PATENTS

| | | | |
|---|---|---|---|
| 2,247,004 | 6/1941 | Sullivan | 15—104.3 |
| 2,355,733 | 8/1944 | Johnson et al. | 15—104.3 |
| 2,488,039 | 11/1949 | Sketchley | 15—104.3 |
| 3,098,251 | 7/1963 | Stewart | 15—104.3 |
| 3,176,335 | 4/1965 | Ciaccio et al. | 15—104.3 |

EDWARD L. ROBERTS, Primary Examiner

U.S. Cl. X.R.

242—54